(12) United States Patent
Chen

(10) Patent No.: US 7,390,087 B2
(45) Date of Patent: Jun. 24, 2008

(54) INDUSTRIAL SAFETY GLASSES

(76) Inventor: Lin-Yun Chen, No. 28-2, Sha Luen, Chung Sha Village, An Ting Shiang, Tainan Hsien (TW)

( * ) Notice: Subject to any disclaimer, the term of this patent is extended or adjusted under 35 U.S.C. 154(b) by 27 days.

(21) Appl. No.: 11/476,162

(22) Filed: Jun. 28, 2006

(65) Prior Publication Data
US 2008/0002144 A1 Jan. 3, 2008

(51) Int. Cl.
*G02C 5/20* (2006.01)
*G00C 5/14* (2006.01)
(52) U.S. Cl. ............... 351/118; 351/121; 351/149
(58) Field of Classification Search ......... 351/118–121, 351/140–143, 148–149, 156, 157
See application file for complete search history.

(56) References Cited

U.S. PATENT DOCUMENTS

| 3,118,962 | A  | * | 1/1964 | Hammond | 351/118 |
| 5,781,273 | A  | * | 7/1998 | Boden | 351/156 |
| 6,736,504 | B1 | * | 5/2004 | Hermsen | 351/116 |
| 7,261,410 | B1 | * | 8/2007 | Chen et al. | 351/110 |

* cited by examiner

*Primary Examiner*—Huy K Mai
(74) *Attorney, Agent, or Firm*—Rosenberg, Klein & Lee

(57) ABSTRACT

A pair of industrial safety glasses comprises: a glasses frame comprising: a connection means connected to each of both ends thereof; a first coupling part on at least one of the connection means; and a second coupling part corresponding to the first coupling part for coupling thereto; and a wearing means having two ends respectively connected to two ends of the connection means, and the wearing means comprising an adjustable unit so as to adjust the length of the wearing means for being suitable for different workers having different sized heads.

4 Claims, 4 Drawing Sheets

INDUSTRIAL SAFETY GLASSES

FIELD OF THE INVENTION

The present invention relates to a pair of glasses, and more particularly to a pair of easy adjustable industrial safety glasses.

BACKGROUND OF THE INVENTION

The workers working in locations of precision engineering, experiment-making, polishing, lathing, woodworking, and so on are requested to wear industrial safety glasses to protect their faces and eyes from flying particles or sheets. However, the existing problems of the safety glasses are listed as follows:

1. In the conventional safety glasses, a pair of earpieces is screwed onto the glasses frame, causing inconvenience in detachment.

2. In the conventional safety glasses, a fastening belt for adjusting the tightness is typically utilized so as to enable the workers to wear the safety glasses comfortably. Because different workers have different sized heads, the fastening belt much be adjusted before wearing the safety glasses. As a result, the safety glasses are not immediately usable after wear, causing inconvenience in use. Besides, the aforesaid adjusting process much be repeated several times so it wastes time and makes the workers irritable.

SUMMARY OF THE INVENTION

In view of the above-mentioned conventional drawbacks, a major object of the present invention is to disclose a pair of industrial safety glasses having an adjusting unit by which the adjusting process can be performed easily.

Another object of the present invention is to disclose a pair of industrial safety glasses having a first coupling part and a second coupling part on the frame and a corresponding structure, respectively, whereby the industrial safety glasses are assembled or disassembled by connection or disconnection between the first and second coupling parts to promote convenience.

In order to achieve the object of the present invention, a pair of easy adjustable industrial safety glasses comprises: a glasses frame comprising: a connection means connected to each of both ends thereof; a first coupling part on at least one of the connection means; and a second coupling part corresponding to the first coupling part for coupling thereto; and a wearing means having two ends respectively connected to two ends of the connection means, and the wearing means comprising an adjustable unit so as to adjust the length of the wearing means for being suitable for different workers having different sized heads.

DETAILED DESCRIPTION OF THE PREFERRED EMBODIMENT

Figure 1:
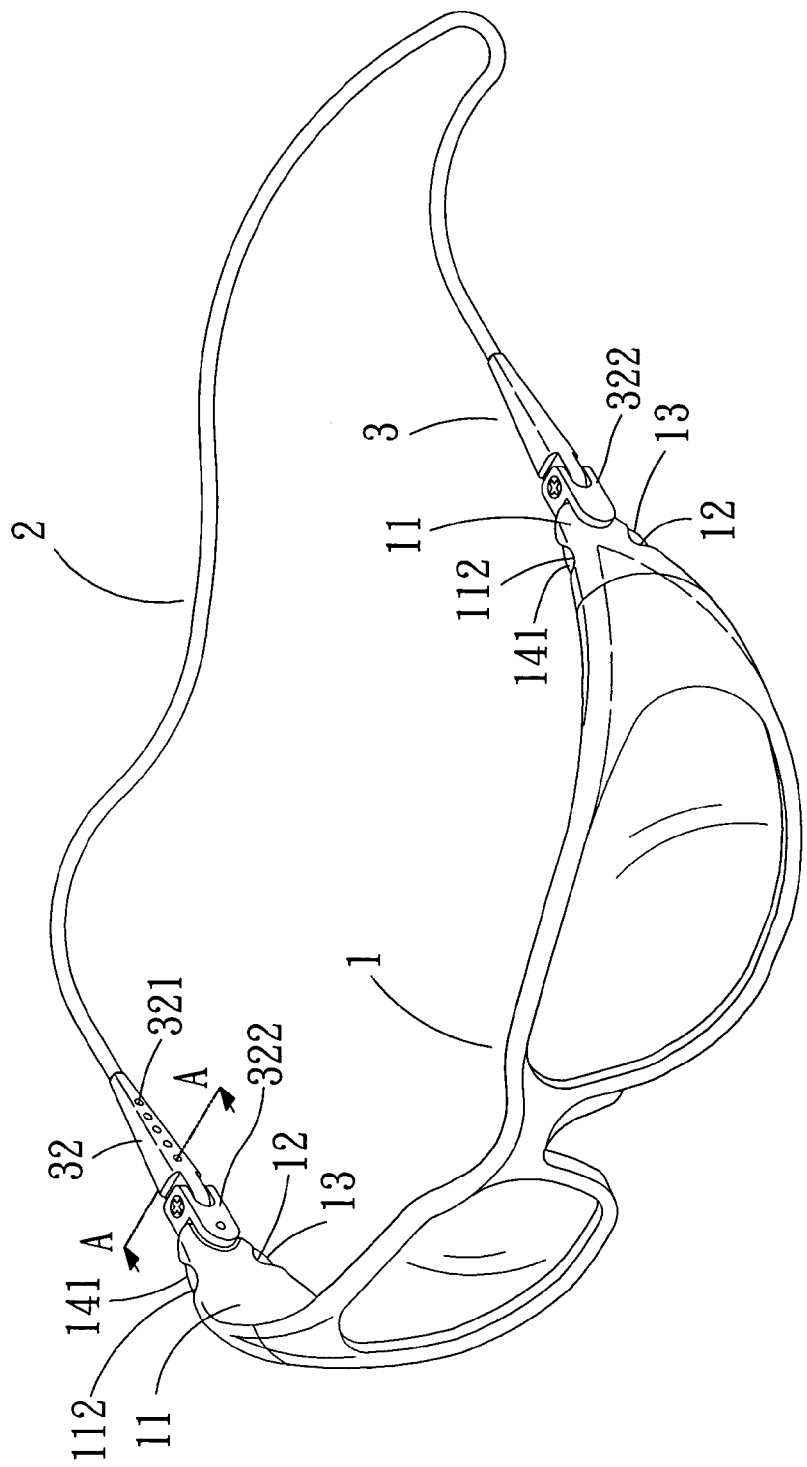
FIG. 1 is a schematic, elevational view of the present invention.

The description taken with the drawings make the structures, features, and embodiments of the present invention apparent to those skilled in the art how the present invention may be embodied in practice.

Referring to FIGS. 1 through 4, a preferred embodiment of a pair of industrial safety glasses of the present invention is shown. The industrial safety glasses generally comprise a glasses frame 1 and a wearing means 2.

The glasses frame 1 has a connection means 11 connected to each of both ends thereof. Besides, at least one of the connection means 11 has a first coupling part 12 corresponding to the lateral edge of the glasses frame 1. In addition, the glasses frame 1 has a second coupling part 13 corresponding to the first coupling part 12 such that the first and second coupling parts 12 and 13 can be coupled to each other.

Figure 4:
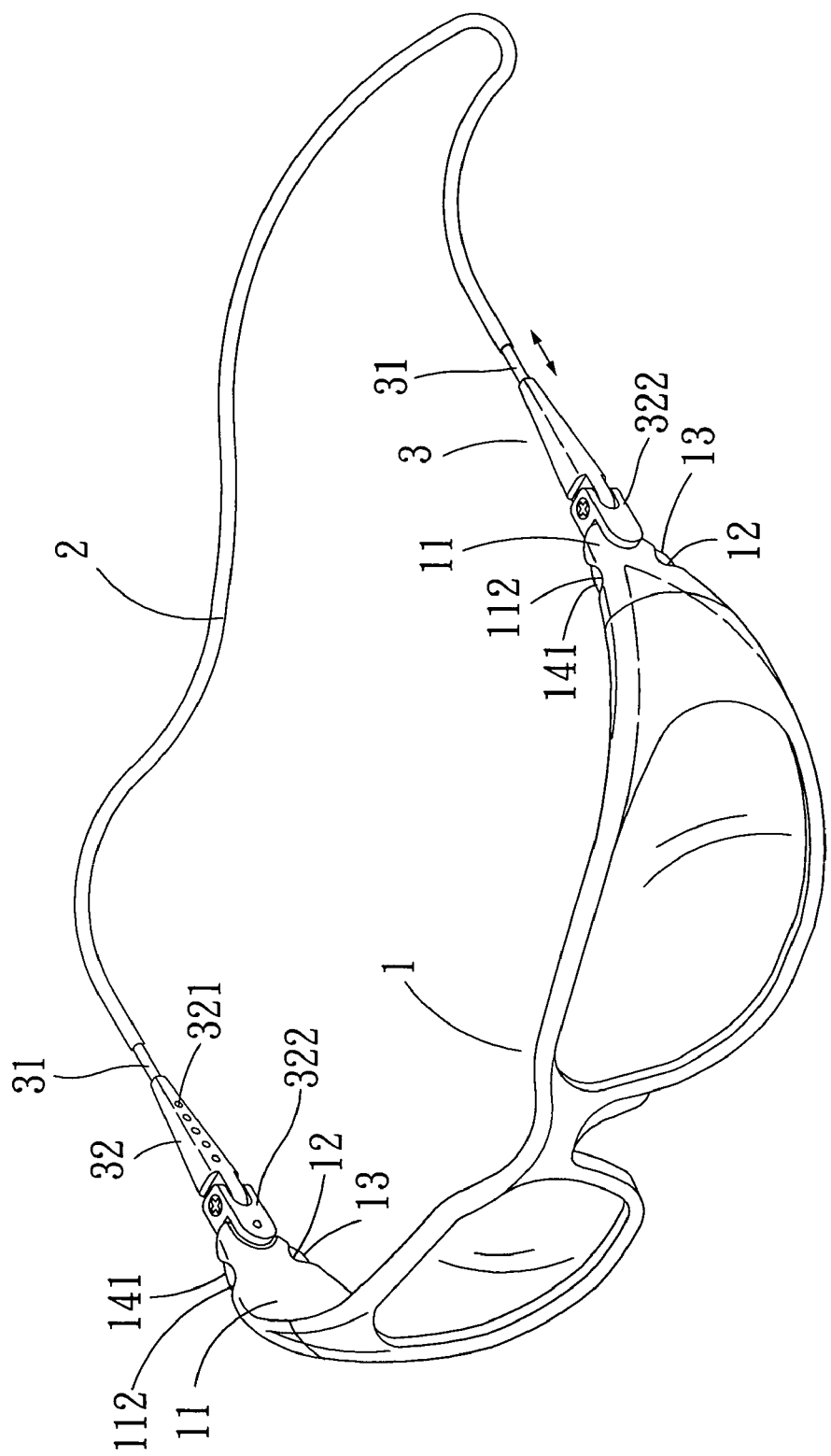
FIG. 4 is a schematic, elevational view showing adjustment of length of the present invention.

The wearing means 2 has two ends respectively connected to the aforesaid two connection means 11 on both ends of the glasses frame 1. In addition, an adjustable unit 3 is disposed on at least one of two ends of the wearing means 2 so as to adjust the length of the wearing means 2, as shown in FIG. 4, for being suitable for different workers having different sized heads. Moreover, the body of the wearing means 2 is bended to form a pair of earpieces nears the both ends thereof for being held on the worker's ears.

Referring again to FIG. 1 and FIG. 2, the second coupling part 13 of the glasses frame 1 is integrally extended from the lateral edge of the glasses frame 1, and the second coupling part 13 comprises at least an insertion part 14 having a hook 141 on a free end, as shown in FIG. 2. In addition, the connection means 11 has a reception hole 111 corresponding to the insertion part 14 of the second coupling part 13 of the glasses frame 1 for insertion of the insertion part 14 thereinto.

Figure 2:
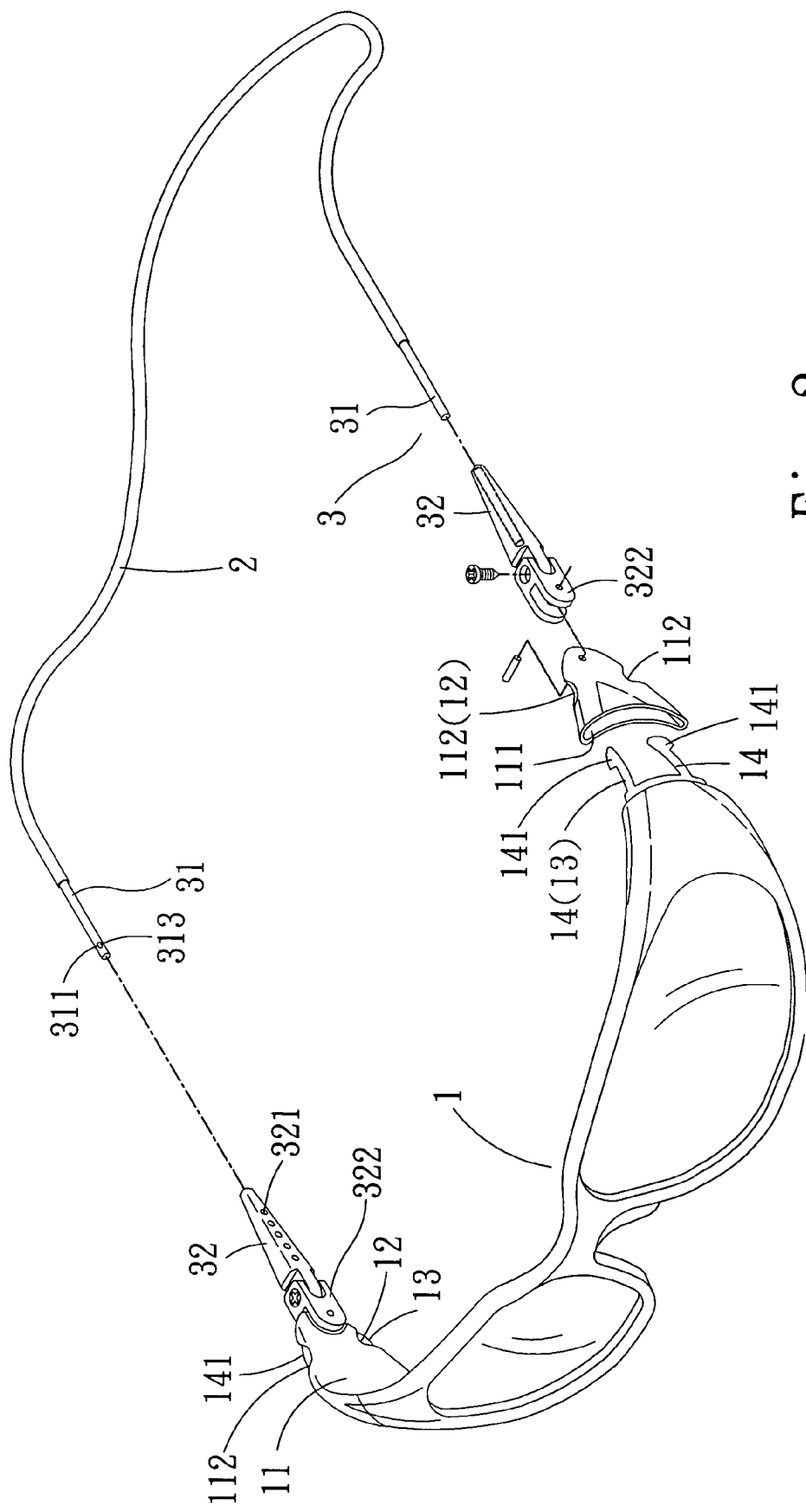
FIG. 2 is a partially exploded, schematic, elevational view of the present invention.
Figure 3:
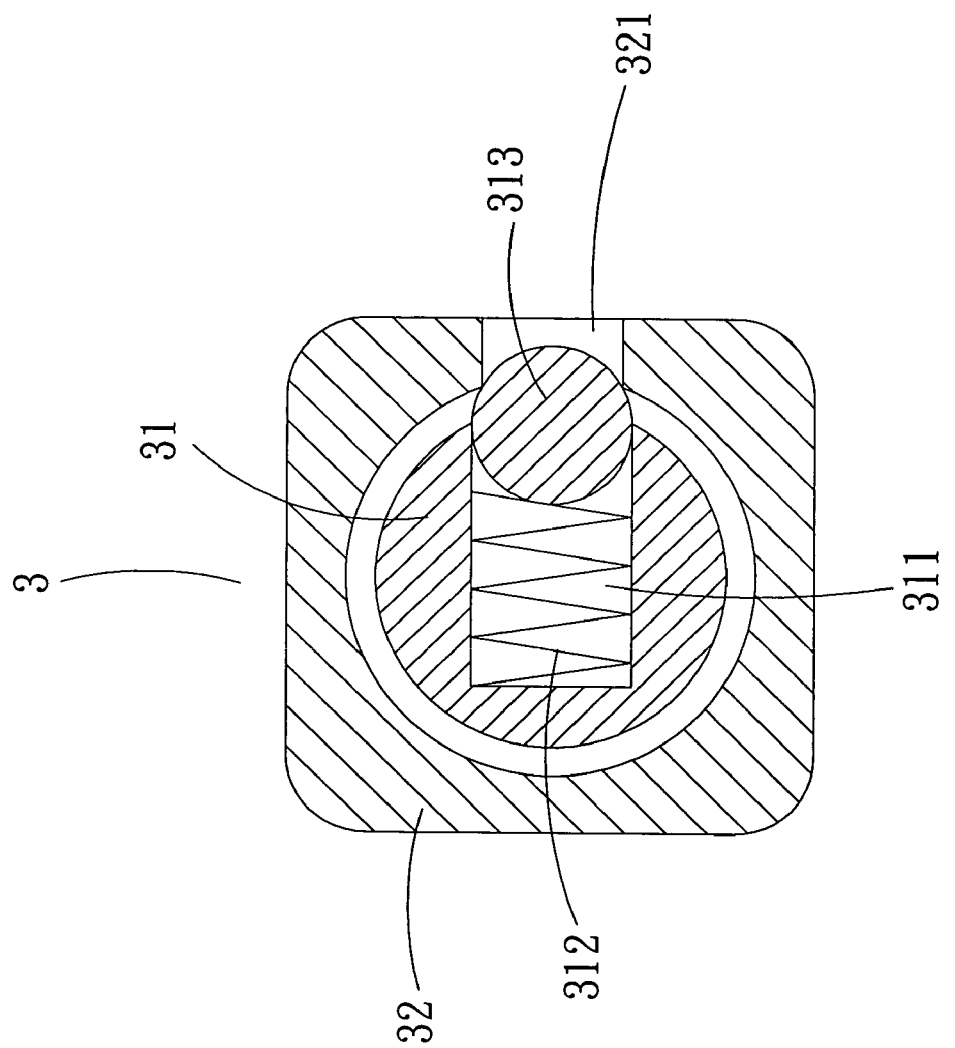
FIG. 3 is a cross-sectional view taken along a line AA in FIG. 1.

In addition, the reception hole 111 of the connection means 11 further has a hooking hole 112 corresponding to the hook 141 of the second coupling part 13 of the glasses frame 1 for securely coupling with the hook 141 of the second coupling part 13 so as to easily and rapidly integrate the connection means 11 with the glasses frame 1, as shown in FIG. 2. On the contrary, the worker can press the hook 141 by hand to separate the hook 141 from the hooking hole 112 of the connection means 11 so that the connection means 11 is separated from the glasses frame 1. Besides, the glasses frame 1 can be hung on the worker's neck. Thus, it is very easy and convenient.

Referring again to FIG. 2 and FIG. 3, the adjustable unit 3 comprises a sliding rod 31 and a sleeve 32. The sliding rod 31 is disposed at the edge of the wearing means 2. The sliding rod 31 has a recessed region 311 on the rod body for holding an elastic means 312 and a ball 313 from bottom to top in sequence. The sleeve 32 is sleeved outside of the sliding rod 31, and one end of the sleeve 32 is connected to the connection means 11. The sleeve 32 has a plurality of through holes 321 spaced at intervals corresponding to the recessed region 311 of the sliding rod 31. As a result, when the sliding rod 31 slides in the sleeve 32, the ball 313 is elastically compressed to generate a restoring elastic force that allows the ball 313 to be positioned in one of the through holes 321. If the length of the wearing means 2 still needs to be adjusted, the sliding rod 31 is pulled to separate the ball 313 from the previous through hole 321 and to allow this ball 313 to be position in another through hole 321. After being repeated several times, the wearing means 2 can be adjusted to a proper length, as shown in FIG. 4, to be suitable for different sized heads.

Moreover, a universal connector 322 is disposed between the other end of the sleeve 32 and the connection means 11 for adjusting the wearing angle, thereby providing the wearing comfort.

On the basis of the description mentioned above, the present invention indeed satisfies the requirements for patentability since it provides practicability and has never been published or used publicly. Therefore, it is submitted for a patent.

With the invention thus explained, it is apparent that various modifications and variations can be made without departing from the scope of the invention. It is therefore intended that the invention be limited only as indicated in the appended claims.

What is claimed is:

1. A pair of industrial safety glass comprising:
   a glasses frame including a connection means connected to each of both ends thereof, a first coupling part and a second coupling part, said second coupling part being formed on at least one of said connection means, said first coupling part being releasably coupled to said second coupling part; and
   a wearing means having two ends respectively connected to said two ends of said connection means, and said wearing means at least comprising an adjustable unit so as to adjust the length of said wearing means for being suitable for different workers having different sized heads, said adjustable unit being disposed on said two ends of said wearing means, and said adjustable unit includes a sliding rod and a sleeve, said sliding rod being disposed at said end of said wearing means, said sliding rod has a recessed region on a rod body thereof for holding an elastic means and a ball from bottom to top in sequence, said sleeve being sleeved outside of said sliding rod, and one end of said sleeve being connected to said connection means, and said sleeve has a plurality of through holes spaced at intervals corresponding to said recessed region of said sliding rod, whereby said ball can be positioned in one of said through holes.

2. A pair of industrial safety glasses as claimed in claim 1, wherein said second coupling part is integrally extended from a lateral edge of said glasses frame, said second coupling part comprises at least an insertion part having a hook on a free end thereof, said connection means has a reception hole corresponding to said insertion part of said second coupling part of said glasses frame for insertion of said insertion part thereinto, and said reception hole of said connection means further has a hooking hole corresponding to said hook of said second coupling part of said glasses frame for securely coupling with said hook of said second coupling part.

3. A pair of industrial safety glasses as claimed in claim 1, wherein a body of said wearing means is bended to form a pair of earpieces nears said two ends thereof for being held on the worker's ears.

4. A pair of industrial safety glasses as claimed in claim 1, wherein a universal connector is disposed between the other end of said sleeve and said connection means for adjusting a wearing angle.

* * * * *